Nov. 7, 1950   M. L. COVER   2,528,642
APPARATUS FOR CONVEYING LIQUIDS
Filed Jan. 30, 1947
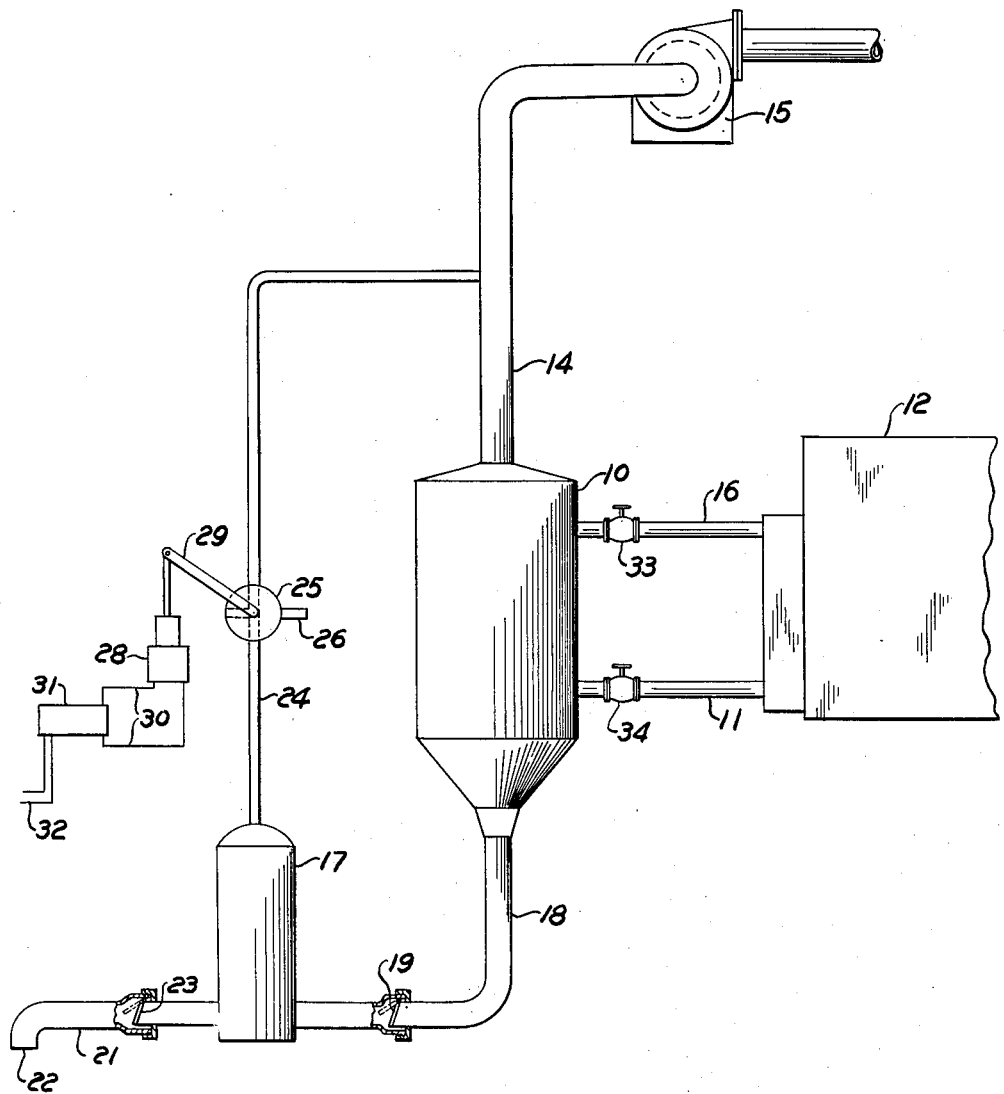
INVENTOR.
MARTIN L. COVER.
BY
ATTORNEY.

Patented Nov. 7, 1950

2,528,642

UNITED STATES PATENT OFFICE 2,528,642

APPARATUS FOR CONVEYING LIQUIDS

Martin L. Cover, Allen Park, Mich., assignor to National Steel Corporation, a corporation of Delaware Application January 30, 1947, Serial No. 725,359

4 Claims. (Cl. 210—62)

This invention relates to a novel apparatus for conveying liquids and more particularly relates to apparatus for conveying and removing liquids from tanks, filters and compartments where the liquid is under subatmospheric pressure and then discharging the liquid at atmospheric pressure.

A preferred embodiment of the present invention will be described in detail in connection with removing water from a filter adapted for separating the solids from blast furnace washwater.

The blast furnace gases contain an appreciable quantity of flue dust which should be removed before the gases are used for heating purposes to prevent the dust from clogging and/or abrading the parts. A customary practice is to wash the blast furnace gas with water to remove this dust. As the dust has a value and can be used in producing usable sinter, the dust is separated from the water. A vacuum filter is used for this purpose in which the water is sucked through a filter which removes most of the flue dust particles. The water, after being drawn through the filter, is at subatmospheric pressure, that is, it is under a partial vacuum and contains some residual dust particles. Removing this water from the filter presents a problem. Heretofore, mechanical vacuum pumps have been used to pump out the water and discharged it to the sewer or other place of disposal at atmospheric pressure. Especially, as a result of the abrasive action by the residual flue dust particles, the life of these pumps is relatively short and they require frequent repair and replacement.

Accordingly, a primary object of this invention is to provide a novel apparatus for conveying liquid from a source where the liquid is under subatmospheric pressure, and then discharging the liquid at atmospheric pressure.

Another object of the present invention is to provide apparatus of this character for removing the filtrate liquid from a vacuum filter that contains a minimum number of moving parts, that will have a relatively long operative life and that will be economical to install and maintain.

The present invention provides a novel apparatus for conveying liquid in which all moving parts subjected to abrasive action by the liquid are substantially completely eliminated. The apparatus comprises a container for receiving the liquid under vacuum, a drain tank positioned to intermittently receive liquid at subatmospheric pressure from the container by gravity flow, and valve means for intermittently changing the pressure in the drain tank so that the tank, after being filled, is emptied at atmospheric pressure. Preferably, the apparatus includes an automatic timer for automatically changing the pressure in the drain tank at predetermined intervals. It has been found in practice that the present apparatus will function over a relatively long period of time without attention and is superior to the positive acting vacuum pumps used heretofore.

These and other objects and advantages will become more readily apparent from the following detailed description taken in connection with the accompanying drawing which schematically shows apparatus arranged to remove filtrate liquid from a filter and in which the principles of this invention are embodied.

Referring to the drawing, the collector vacuum tank 10 which is adapted to receive the water to be conveyed is connected through a lower pipe 11 to one end of the filter 12 so that the water can flow from the filter 12 through pipe 11 into the lower portion of tank 10. The upper portion of tank 10 is connected through pipe 14 to exhaust means 15 and through upper pipe 16 to the filter 12. The exhaust means or air pump 15 draws air from filter 12 through the upper pipe 16 and tank 10 and pipe 14 to discharge the air to the atmosphere. Thus, the exhaust means 15, which may be an air pump of conventional design, maintains the liquid in tank 10 under subatmospheric pressure. A drain tank 17 is connected through pipe 18 to the lower portion of tank 10. The tanks 10 and 17 are so positioned relative to each other that water can flow by gravity through pipe 18 into the drain tank 17. A check valve 19 is provided in pipe 18 and is so constructed and arranged as to permit the flow of water from tank 10 to tank 17 only when the pressure on the downstream side is less than on the upstream side of the valve 19, and to prevent flow of water or air in the opposite direction through pipe 18 when the pressure on the downstream side is greater than on the upstream side. An outlet pipe 21 is in communication with the lower portion of drain tank 17 and terminates in an outlet 22 for discharging liquid at atmospheric pressure. The outlet end of pipe 22 can be connected, if desirable to a sewer, disposal tank or other place of discharge at atmospheric pressure. The pipe 21 includes a check valve 23 which is constructed and arranged so as to permit flow of water only from the drain tank 17 and prevent flow in the opposite direction. The upper end of the drain tank 17 is connected through pipe 24 to the pipe 14 which is in turn connected to the exhaust means 15. In the present embodiment the same exhaust means 15 is used to exhaust and create a subatmospheric pressure in both the collector tank 10 and drain tank 17. Separate pumps could be used. A valve 25 is operatively interposed in pipe 24 and includes passage containing member 26 which communicates with the atmosphere. As indicated in the drawing, the valve 25 can be positioned to connect the drain tank 17 with the exhaust means 15 so that the pressure in tank 17 is below atmospheric or, the valve 25 can be positioned to connect the tank 17 with the passage in member 26 so that the pressure in tank 17 is raised to atmospheric pressure. Solenoid valve 28 is connected through handle 29 to valve 25 and is connected through wires 30 to a timer 31 which is in turn connected through wires 32 to a source of electricity. The timer 31 may be of any conventional type and is preferably constructed to intermittently energize and de-energize the solenoid 28 to move the valve to first one position and then the other at predetermined intervals.

Flow control valves 33 and 34 may be provided in pipes 16 and 11, respectively, to control the rate of flow of air and liquid from the filter.

The tank 10 is under vacuum and water continuously flows through pipe 11 in the collector tank. With the solenoid 28 de-energized and valve 25 in the position shown, the pressure in the drain tank 17 is subatmospheric and is the same as the pressure in tank 10. Thus, the head of water is higher on the upstream side of check valve 19 so that water flows by gravity and under subatmospheric pressure into drain tank 17. As the pressure in tank 17 is subatmospheric, the check valve 23 is held closed by the higher atmospheric pressure on the downstream side so that the water does not flow out the outlet pipe 21. When the drain tank 17 is substantially full, or before, the timer 30 automatically energizes solenoid 28 to operate valve 25 and admit air to tank 17 through the passage in valve member 26. The pressure in drain tank 17 is now atmospheric and the water in tank 17 flows out through outlet 22 under atmospheric pressure. Valve 19 is held closed so that there is no backward flow in pipe 18. When the drain tank is empty, the timer de-energizes solenoid 28 to return the valve 25 to the first position and the cycle is repeated.

With the present apparatus, the liquid flows under the influence of gravity and only a relatively small amount of power is required to create and maintain the vacuum required. The amount of abrasion is reduced to minimum so that there is no appreciable wearing out of the parts. The timer 31 preferably is adjustable so that it can be readily set to automatically cause operation of the valve 25 at the proper, predetermined intervals.

I claim:

1. Apparatus for conveying liquid comprising in combination a vacuum tank for receiving fluid to be conveyed at subatmospheric pressure; a drain tank; exhaust means for maintaining subatmospheric pressure within the vacuum tank and for producing subatmospheric pressure in the drain tank; means connecting the vacuum tank and the drain tank, all constructed and arranged to effect flow of liquid only from the vacuum tank to the drain tank; a liquid outlet means communicating with the lower portion of the drain tank and being constructed and arranged to effect flow of liquid only from the drain tank; power actuated valve means connected to the drain tank and to the exhaust means, the valve means having a passage communicating with the atmosphere and being operable to connect the drain tank and the exhaust means to produce subatmospheric pressure in the drain tank and being operable to connect the drain tank with the passage communicating with the atmosphere to produce atmospheric pressure in the drain tank; and automatic timer means operatively connected to the valve means to intermittently operate the valve means at predetermined periods alternately to connect the drain tank and exhaust means to effect the flow of liquid from the vacuum tank through the tank connecting means into the drain tank under the influence of gravity at subatmospheric pressure and to connect the drain tank with the valve passage communicating with the atmosphere to effect the flow of liquid by gravity from the drain tank through the liquid outlet at atmospheric pressure.

2. Apparatus for conveying liquid comprising in combination a vacuum tank for receiving the liquid to be conveyed at subatmospheric pressure; a drain tank connected to the vacuum tank, said tanks being arranged to effect gravity flow of liquid from the vacuum tank to the drain tank; exhaust means for maintaining subatmospheric pressure within the vacuum tank and for producing subatmospheric pressure in the drain tank; a check valve operatively interposed between the tanks and constructed so that liquid flows only from the vacuum tank to the drain tank; a liquid outlet passage communicating with the drain tank; a check valve operatively associated with the outlet passage, said last-mentioned check valve being constructed and arranged so that liquid flows only from the drain tank; adjustable valve means connected to the drain tank and to the exhaust means, the valve means having a passage communicating with the atmosphere and being operable to connect the tank and the exhaust means to produce subatmospheric pressure in the drain tank and being operable to connect the drain tank with the passage communicating with the atmosphere to produce atmospheric pressure in the drain tank; a solenoid operatively connected to the valve means for operating the same; an automatic timer operatively connected to the solenoid valve, said timer being constructed and arranged to alternately energize and de-energize said solenoid for predetermined periods so that said valve means is operated alternately to connect the tank and the exhaust means to effect the flow of liquid from the vacuum tank into the drain tank under the influence of gravity at subatmospheric pressure and to connect the drain tank with the valve passage to effect the flow of liquid from the drain tank through the outlet passage at atmospheric pressure.

3. Apparatus for conveying liquid comprising in combination a vacuum tank for receiving the liquid to be conveyed; a drain tank connected to the lower portion of the vacuum tank, said tanks being arranged to effect gravity flow of liquid from the vacuum tank to the drain tank; a vacuum pump connected to the upper portion of the vacuum tank and connected to the upper portion of the drain tank for producing subatmospheric pressure in the tanks; a check valve operatively interposed between the tanks and constructed so that liquid flows only from the vacuum tank into the drain tank; outlet passage means communicating with the lower portion of the drain tank and constructed to effect the flow of liquid only from the drain tank at atmospheric pressure; power actuated valve means operatively interposed between the drain tank and the vacuum pump, said valve means including a passage communicating with the atmosphere and said valve means being operable to connect the drain tank and vacuum pump to produce subatmospheric pressure in the drain tank and effect the flow of liquid from the vacuum tank into the drain tank under the influence of gravity at subatmospheric pressure and being operable to connect the drain tank with the valve passage and the atmosphere to produce atmospheric pressure in the drain tank and effect the flow of liquid from the tank into the outlet passage under the influence of gravity at atmospheric pressure; and timer means operatively connected to the valve means to intermittently operate the valve means at predetermined periods alternately to connect the drain tank with the vacuum pump and to connect the drain tank with the valve passage communicating with the atmosphere.

4. Apparatus for conveying filtrate liquid from a vacuum filter comprising a collector tank; a lower pipe connecting the lower portion of the collector tank with the filter for conveying liquid from the filter to the collector tank; an upper pipe connecting the upper portion of the collector tank with the filter for conveying air from the filter to the tank; exhaust means communicating with the upper portion of the collector tank for exhausting air from the collector tank and the filter and maintaining a subatmospheric pressure in the collector tank; a lower drain tank; a pipe connecting the drain tank with the lower portion of the collector tank; a check valve connected to the pipe and constructed so that liquid flows only from the collector tank to the lower drain tank; a drain tank outlet communicating with the atmosphere; a check valve connected to the outlet so that liquid flows only from the drain tank; valve means connected to the drain tank, the valve means including a passage communicating with the atmosphere and a passage communicating with the exhaust means, and the valve means being operable to connect the drain tank with the exhaust means and being operable to connect the drain tank with the atmosphere; timer means operatively connected to the valve means and automatically operable at predetermined periods alternately to operate the valve means to connect the drain tank with the exhaust means and to operate valve means to connect the drain tank with the valve passage whereby the drain tank is alternately filled and emptied.

MARTIN L. COVER.

REFERENCES CITED

The following references are of record in the file of this patent:

UNITED STATES PATENTS

| Number | Name | Date |
|---|---|---|
| 992,711 | Freeman | May 16, 1911 |
| 1,724,436 | Sweetland | Aug. 13, 1929 |
| 2,047,229 | Samiran | July 14, 1936 |
| 2,330,508 | McColl | Sept. 28, 1943 |